(12) United States Patent  (10) Patent No.: US 8,662,017 B2
Venezio  (45) Date of Patent: Mar. 4, 2014

(54) PET LITTER

(76) Inventor: William R. Venezio, Schenectady, NY (US)

( * ) Notice: Subject to any disclaimer, the term of this patent is extended or adjusted under 35 U.S.C. 154(b) by 299 days.

(21) Appl. No.: 13/006,472

(22) Filed: Jan. 14, 2011

(65) Prior Publication Data

US 2011/0107975 A1  May 12, 2011

Related U.S. Application Data

(63) Continuation-in-part of application No. 12/027,236, filed on Feb. 6, 2008, now abandoned, and a continuation-in-part of application No. 11/221,082, filed on Sep. 7, 2005, now abandoned, and a continuation-in-part of application No. 10/928,988, filed on Aug. 30, 2004, now abandoned.

(51) Int. Cl.
*A01K 1/015* (2006.01)

(52) U.S. Cl.
USPC .......................................................... 119/171

(58) Field of Classification Search
USPC .......................................... 119/171, 172, 173
See application file for complete search history.

(56) References Cited

U.S. PATENT DOCUMENTS

| | | | |
|---|---|---|---|
| 3,789,797 A | 2/1974 | Brewer | |
| 3,921,581 A | 11/1975 | Brewer | |
| 4,129,541 A * | 12/1978 | Marrs et al. | 524/71 |
| 4,355,593 A | 10/1982 | Stapley | |
| 4,424,763 A | 1/1984 | Johnson | |
| 4,465,019 A | 8/1984 | Johnson | |
| 4,471,717 A | 9/1984 | Lander | |
| 4,638,763 A | 1/1987 | Greenberg | |
| 4,671,208 A | 6/1987 | Smith | |
| 4,676,196 A * | 6/1987 | Lojek et al. | 119/172 |
| 5,014,650 A * | 5/1991 | Sowle et al. | 119/171 |
| 5,062,383 A | 11/1991 | Nelson | |
| 5,094,189 A | 3/1992 | Aylen et al. | |
| 5,100,600 A | 3/1992 | Keller et al. | |
| 5,207,830 A * | 5/1993 | Cowan et al. | 106/672 |
| 5,329,880 A * | 7/1994 | Pattengill et al. | 119/171 |
| 5,359,960 A | 11/1994 | Yananton | |
| 5,359,961 A | 11/1994 | Goss et al. | |
| 5,415,131 A | 5/1995 | Dodman | |
| 5,577,463 A | 11/1996 | Elazier-Davis et al. | |
| 5,860,391 A | 1/1999 | Maxwell et al. | |
| 5,961,968 A | 10/1999 | Moore, Jr. | |
| 5,964,186 A * | 10/1999 | Koneke | 119/169 |
| 6,019,063 A | 2/2000 | Haubensak et al. | |
| 6,294,118 B1 | 9/2001 | Huber et al. | |
| 6,405,678 B2 * | 6/2002 | Ikegami et al. | 119/171 |
| 6,854,421 B2 | 2/2005 | Opfel | |
| 7,219,624 B2 * | 5/2007 | Yasukawa | 119/171 |
| 7,343,874 B2 * | 3/2008 | DeLeeuw et al. | 119/171 |
| 2006/0042552 A1 | 3/2006 | Venezio | |

* cited by examiner

*Primary Examiner* — Rob Swiatek
*Assistant Examiner* — Justin Benedik
(74) *Attorney, Agent, or Firm* — Schmeiser Olsen & Watts, LLP

(57) ABSTRACT

A pet litter composed of about 99.992% to about 99.998% by weight sand particles, which may be screened with a 20-50 mesh, and from about 0.002% to about 0.008% by weight of a thickener. In addition, the thickener added to the sand base to enhance the clumping properties of the litter may be digested by cats.

10 Claims, 1 Drawing Sheet

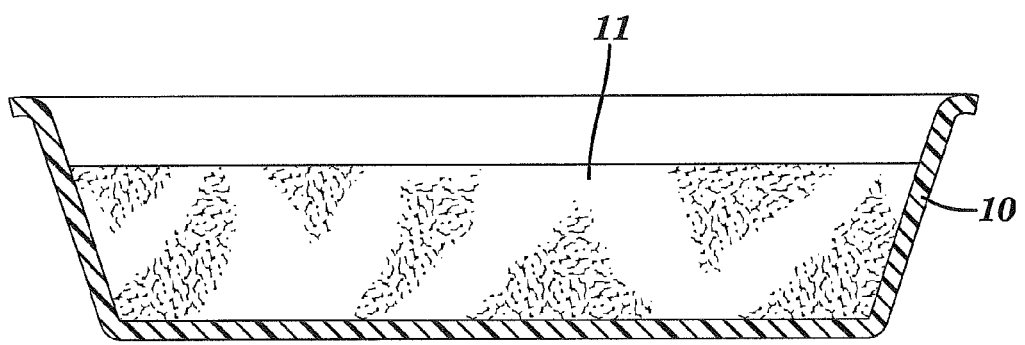

PET LITTER

CROSS REFERENCE TO RELATED APPLICATIONS

The present patent application is a continuation-in-part of a non-provisional U.S. patent application Ser. No. 12/027,236 filed Feb. 6, 2008, which is a continuation-in-part of Ser. No. 11/221,082 filed Sep. 7, 2005, now abandoned, which is a continuation-in-part of Ser. No. 10/928,988, filed Aug. 30, 2004 now abandoned, the disclosure of each is herein incorporated by reference to the extent not inconsistent with the present disclosure.

FIELD OF THE DISCLOSURE

The present disclosure relates generally to a pet litter, particularly for cats. The present disclosure includes sand particles and a thickener other than bentonite clay.

BACKGROUND OF THE DISCLOSURE

Many clumping pet litters on the market today use bentonite clay, which naturally absorbs liquid, to promote clumping. Clays when ingested may cause health problems in animals such as cats that use litter boxes. The instant disclosure addresses the problems of clay use.

SUMMARY OF THE DISCLOSURE

A first embodiment is a pet litter composition comprising: at least 90% sand particles by weight; and a thickener, wherein the thickener produces viscosity when contacted with urine such that a clump is formed out of the litter and urine, and wherein the thickener may be digested by cats.

A second embodiment of the disclosure is a pet litter consisting essentially of at least 90% sand particles, 5-10% limestone particles and 2-5% guar gum, wherein the limestone particles are sized between 0.0001 mm and 4.75 mm.

A third embodiment of the disclosure is a method of preparing a pet litter box which comprises the steps of: screening sand particles with a 20-150 mesh screen; reducing limestone to particles 0.0001 mm to 4.75 mm in size; combining the screened sand and the reduced limestone particles with a thickener to form a pet litter; and placing the pet litter in a receptacle as a litter bed therein.

A fourth embodiment is an pet litter composition comprising: from about 99.992% to about 99.998% sand particles by weight; and from about 0.002% to about 0.008% Thickener in the form of guar gum, wherein the thickener produces viscosity when contacted with urine such that a clump is formed out of the litter composition and urine, and wherein the guar gum may be digested by cats.

BRIEF DESCRIPTION OF THE DRAWING

The single FIGURE of the drawing is a vertical section through a pet litter box in accordance with the present disclosure, consisting of a conventional open-topped pet litter receptacle and a bed of sand particles in accordance with the present disclosure.

FIG. 1 displays a cutaway view of the pet litter in a litter box.

DETAILED DESCRIPTION OF THE DISCLOSURE

Before explaining the present disclosure in detail, it is to be understood that the disclosure is not limited in its application to the particular arrangement shown and described since the disclosure is capable of other embodiments. Also, the terminology used herein is for the purpose of description and not of limitation.

In accordance with an the embodiment of this disclosure, the litter in the form of either 98% sand or 98% pure crushed limestone, which may be dolomitic, calcitic, or any other type of limestone, is crushed, washed, dried, and screened to pass only particles within the size range from 0.0001 mm (0.1 µm) to 4.75 mm and a thickener. The limestone particles or sand particle mix 11 is combined with at least 2% thickener and put into a conventional, urine-proof, open-topped receptacle 10. Together they make up what is commonly called a "litter box." In addition to its advantageous clumping properties, the ground limestone of the present disclosure when used also acts as an odor-fighting material.

The cat litter material of the present disclosure in one embodiment may consist essentially of ground limestone, as specified, with nothing else added essentially being 100% pure. However, without departing from the teaching of this disclosure, one or more other materials may be included in the litter bed 11 to add color or absorb or mask the odor caused by pet urine, so long as these additional materials do not significantly diminish the clumping properties of the pure limestone particles.

An embodiment of the present disclosure uses as a pet litter with a base of limestone particles, sand or a combination thereof with at least two percent thickener added. The limestone particles range in size 0.1 µm (0.0001 mm) to 4.75 mm. The limestone particles may be dolomitic or calcitic limestone, or any other type of limestone. The thickener produces viscosity by forming a gel or colloid with the thickener when contacted with urine and enhances the clumping properties of the litter when sand, limestone or a combination thereof. Thus, when limestone particles that are too large to clump on their own are included in the pet litter, the thickener ensures that the litter will clump when it becomes wet. The pet litter composition of this embodiment contains either primarily limestone or sand, comprising 80-98% of the litter. A small amount of thickener, between 2 and 20%, is added to the limestone base, sand base or combinations thereof. Thus, the composition of the present disclosure could range from 98% limestone or sand particles: 2% thickener to 80% limestone or sand particles: 20% thickener. The sand and limestone particles can be either pure or any combination thereof between 0-100-0.

The thickener used must be digestible by cats to avoid the problems that may be associated with clumping cat litters that include clumping components that are not digestible, such as bentonite clays, particularly sodium bentonite. For example, aside from breathing in the dust when in the litter box, after cats that have been in a clumping litter clean themselves with their mouths, they ingest a portion of the cat litter. The litter in the cat expands and can form a mass or coating on the respiratory and/or intestinal track of the cat. Dehydration, prevention of absorption of nutrients, respiratory problems, and depressed immune systems may result. However, if the clumping agent is digestible by the pet, the pet's body is better able to process any ingested dust or particles.

Thickeners that are recommended to mix with either the sand or limestone base is any form of guar gum, such as powder or granular guar gum, cellulose gum, xanthan gum, carob gum, locust bean gum, starch, carrageenan, alginate, and any combination of these compounds may be added to the limestone particle base. The pet litter, including the thickener, does not contain bentonite clays, including sodium bentonite. Instead, the thickener can be, but does not need to be, food grade, as most of the thickeners listed are used as food additives. The thickener should not need to be heated to get thick and form a gel like colloid in the presence of water, specifically acidic urine and should disperse and swell in either hot or cold water. Any viscosity grade, or type, of thickener can be used. The thickener initially forms the pet litter and urine into a clump, then, once it is ingested, begins to dissolve. Therefore, the litter is able to pass through the cat's digestive system.

The pet litter is formed by reducing the limestone to particles 0.0001 mm to 4.75 mm in size or sifting the sand and then combining either the thickener and optionally the sand with the limestone particles. The ingredients are mechanically blended to form the pet litter. Any form of mechanical mixing may be used. The reducing of particle size and combining of the particles can be executed in any order. For example, the limestone may be crushed and placed through a mesh sieve to achieve the desired particle size, and then the limestone particles and the thickener may be placed in a ribbon blender which stirs up the dry products. The blended animal, or pet, litter is placed in a receptacle, or litter box, and forms the litter bed therein.

One embodiment of the pet litter uses either 98% limestone particles or sand and 2% guar gum. The limestone particles are reduced to approximately a 16/30 mesh particle size (the particles pass through a U.S. mesh 16 screen but not through a U.S. mesh 30 screen). Thus, the particles are approximately between 0.6 mm and 1.18 mm in size. Guar gum, a natural, nontoxic and biodegradable product, is added in powder form. The ingredients are combined and used as a pet litter. When the litter is contacted with pet urine, the guar gum reacts by gelling within seconds of becoming wet. If an animal, such as a cat, ingests the litter, the guar gum is digested by the cat and the litter passes through the cat's digestive system.

A presently preferred embodiment of the pet litter uses from about 99.992% to about 99.998% sand and from about 0.002% to about 0.008% guar gum. The sand particles are reduced to approximately a 20/50 mesh particle size (the particles pass through a U.S. mesh 20 screen but not through a U.S. mesh 50 screen), which removes the silt but keeps a small particles. Guar gum, a natural, nontoxic and biodegradable product, may be added in powder form. The ingredients may be combined and used as a pet litter. When the litter is contacted with pet urine, the guar gum reacts by gelling within seconds of becoming wet. If an animal, such as a cat, ingests the litter, the guar gum is digested by the cat and the litter passes through the cat's digestive system. The definition of sand is crushed rock of a certain particle size, the size of sand particles varies, but in general sand contains particles measuring about 0.0025-0.08 in (0.063-2.0 mm) in diameter. Particles smaller than 0.063 mm in diameter are classified as silt, which is below the desired size. Larger particles are either granules or gravel, depending on their size. In the construction business, all aggregate materials with particles smaller than 0.25 in (6.4 mm) are classified as fine aggregates, which may include sand.

The pet litter preparation is a particle mix 11 that also may use what is commonly known as sand that is put in a conventional, urine-proof, open-topped receptacle 10. The sand particles should be relatively dust free, but small enough to trap and adsorb pet urine. To ensure the proper range of sand particle sizes it is sifted using a mesh sized from 20/50 mesh (the particles pass through a U.S. mesh 16 screen but not through a U.S. mesh 50 screen), which removes the silt but keeps the small particles. Together they make up what is commonly called a "litter box." The cat urine when it is deposited upon the sand is rapidly absorbed and draws the moisture along the surface of the particle and gravity quickly removes it from the surface of the litter box.

Another pet litter composition 11 may comprise at least 90% sand particles by weight of the composition 11. The rocks that sand consists of can be of any chemical makeup, but it is typically a water insoluble inorganic compound such as silica or other minerals in various combinations. A typical sand that may be used is either mason sand or concrete sand and may be colored. Other sources are sand formed from glacial or grinding action that are deposited in large beds either by the melting edge of glaciers or streams and rivers. Sand has a density of 2,600-3,100 lb per cubic yard (1,538-1,842 kg per cubic meter). The trapped water content between the sand particles can cause the density to vary substantially.

In another embodiment the sand may also comprise a thickener, wherein the thickener produces viscosity when contacted with urine such that a clump is formed out of the litter and urine, and wherein the thickener may be digested by cats. The pet litter comprises at least 1-97% sand particles, 1-97% limestone particles and 2-5% thickener, wherein the limestone particles are sized between 0.0001 mm and 4.75 mm and the sand is screened with a 20 to 50 mesh.

The pet litter that comprises from about 99.992% to about 99.998% by weight beach, mason, concrete, river or glacial sand sorted with a mesh sized 20-50 or even 150 and may have at from about 0.002% to about 0.008% r thickener by weight to hold the urine or waste. The inorganic particle may be a colored mason sand that would allow the pet owner to fill the litter box with a desired color litter. The thickener is selected from the group consisting of guar gum, cellulose gum, xanthan gum, carob gum, locust bean gum, starch, carrageenan, alginate, and any combination of the compounds, wherein the thickener may be a food grade thickener. The pet litter does not contain bentonite clays because of problems that may arise during digestion.

Another embodiment of the pet litter comprises at least 90% sand particles, 5-10% limestone particles and 2-5% thickener, wherein the limestone particles are sized between 0.0001 mm and 4.75 mm and the sand is screened with a 20 to 50 sized mesh. The sand particles performance may be enhanced by adding components that may work in conjunction with the properties of the acidic urine. The use of limestone particles in this size range to coat the sand is useful for retaining pet waste, particularly a cat litter, is based on observation of a noticeable clumping effect when an acidic watery solution, such as cat urine, contacts a bed of such particles. The overall reaction when an acidic solution, such as pet urine, is dripped onto ground limestone is as follows:

$$CaCO_3 + H_2O^{acid} = CO_{2(g)} + Ca(OH)_2$$

It appears that the reaction product calcium hydroxide is primarily responsible for the clumping of the limestone particles that was observed. The carbon dioxide evolved from the reaction makes the reaction irreversible. Under microscopic examination before the reaction, the limestone particles have a white powdery coating, presumably calcium carbonate, on the particle surfaces. Tests indicate that the above-specified chemical reaction takes place primarily in this coating because there is no significant change in the particle size as a result of the reaction. Bubbling of hydrogen dioxide gas is observed, taking place more vigorously on the smaller sized particles than on the larger ones within the size range previously specified herein. Clumping is more pronounced the smaller the limestone particle size, so for purposes of this disclosure, the smaller the better. The pet litter also may not contain bentonite clays or are completely free thereof.

The third embodiment of the pet litter 11 may have the thickener selected from the group consisting of guar gum, cellulose gum, xanthan gum, carob gum, locust bean gum, starch, carrageenan, alginate, and any combination of the compounds. The pet litter 11 may be formulated with the guar gum in a granular form or a powder form. The thickener may optionally be 2-5% by weight and be combined with 5-10% by weight of limestone. The selected thickener and limestone may either be dry blended with the screened sand or for a dry blended distribution or it may be blended into a lightly wetted sand base so as to enable one to substantially coat each grain with a combination of thickener and limestone in a thin layer. The limestone may be crushed to particles approximately between 0.6 mm and 1.18 mm in size to aid in blending.

Example 1

Take a 25 lb bag of inorganic particles having any combination of sand and limestone. Add 6-8 ounces of a thickener such as a guar gum via a mix blender to the 25 lb bag. Odor absorption is maximized with at least 5 lbs of the inorganic blend was limestone.

Example 2

A 25 lb bag of sand may be added to about 0.8 to about 3.2 ounces of a thickener such as a guar gum. Once the thickener has been combined with the sand, blend the sand and the thickener in a mix blender to distribute the thickener throughout the sand.

Example 3

476.16 ounces (measured with a digital scale) of classified sand was added to about 3.84 ounces of guar gum. Once the guar gum was combined with the sand, the combination was blended in a mix blender to distribute the thickener throughout the sand. The blended combination was tested with cat urine and found to produce a firm clumping product.

Example 4

477.60 ounces (measured with a digital scale) of classified sand was added to about 2.40 ounces of guar gum. Once the guar gum was combined with the sand, the combination was blended in a mix blender to distribute the thickener throughout the sand. The blended combination was tested with cat urine and found to produce a firm clumping product.

Example 5

479.04 ounces (measured with a digital scale) of classified sand was added to about 0.96 ounces of guar gum. Once the guar gum has was combined with the sand, the combination was blended in a mix blender to distribute the thickener throughout the sand. The blended combination was tested with cat urine and found to produce a firm clumping product.

A method of preparing a pet litter box which comprises the steps of: screening sand particles with a 20-50 mesh screen; reducing limestone to particles 0.0001 mm to 4.75 mm in size; combining the screened sand and the reduced limestone particles with a thickener to form a pet litter; and placing the pet litter in a receptacle as a litter bed therein. The method of preparing a pet litter box may include selecting a thickener from the group consisting of cellulose gum, xanthan gum, carob gum, locust bean gum, starch, carrageenan, alginate, and any combination of the compounds.

A method of preparing a pet litter box which comprises the steps of: screening sand particles with a 20-50 mesh screen; combining the screened sand with a guar gum to form a pet litter; and placing the pet litter in a receptacle as a litter bed therein. The method of preparing a pet litter box may include selecting a thickener from the group consisting of cellulose gum, xanthan gum, carob gum, locust bean gum, starch, carrageenan, alginate, and any combination of the compounds.

Another embodiment of the pet litter comprises the steps of combining about 99.992% to about 99.998% by weight sand with from about 0.002% to about 0.008% by weight of a thickener in the form of guar gum by weight to form a pet litter. The sand particles may be screened with a 20-50 mesh screen and placing the resulting pet litter in a receptacle as a litter bed therein.

The foregoing description of the present disclosure has been presented for purposes of illustration and description. It is not intended to be exhaustive or to limit the disclosure to the precise form disclosed, and many modifications and variations are possible in light of the above teaching. Such modifications and variations that may be apparent to a person skilled in the art are intended to be included within the scope of this disclosure as defined by the accompanying claims.

What is claimed is:

1. A pet litter composition comprising:
   at least about 98% sand particles by weight, wherein the sand particles are pure sand; and
   at most about 2% thickener in the form of a gum by weight.

2. The pet litter composition of claim 1, wherein the gum is a guar gum and produces viscosity when contacted with urine such that a clump is formed out of the litter and urine, and wherein the thickener may be digested by cats.

3. The pet litter of claim 1, wherein the sand is a colored mason sand.

4. The pet litter of claim 1, wherein the pet litter contains no bentonite clays.

5. A pet litter consisting of:
   at least about 98% sand particles by weight, wherein the sand particles are pure sand; and
   at most about 2% thickener in the form of a gum by weight, the sand being screened with a 20 to 50 mesh.

6. The pet litter of claim 5, wherein the pet litter does not contain bentonite clays.

7. The pet litter of claim 5, wherein the thickener is a guar gum in a granular form.

8. The pet litter of claim 5, wherein the thickener is a guar gum in a powder form.

9. A method of preparing a pet litter box which comprises the steps of:
   screening sand particles with a 20-50 mesh screen, wherein the resulting sand particles are pure sand;
   combining at least about 98% screened sand with at most about 2% of a thickener in the form of guar gum by weight to form a pet litter, wherein the screened sand is pure sand; and
   placing the pet litter in a receptacle as a litter bed therein.

10. The method of preparing a pet litter box as in claim 9, further comprising the step of:
   selecting the desired color of sand before mixing.

* * * * *